Jan. 26, 1965 E. V. KOOLS 3,167,175
SELF-CLEANING CONVEYOR MECHANISM
Filed Aug. 14, 1961 2 Sheets-Sheet 1

INVENTOR.
Edward V. Kools
BY
ATTORNEYS

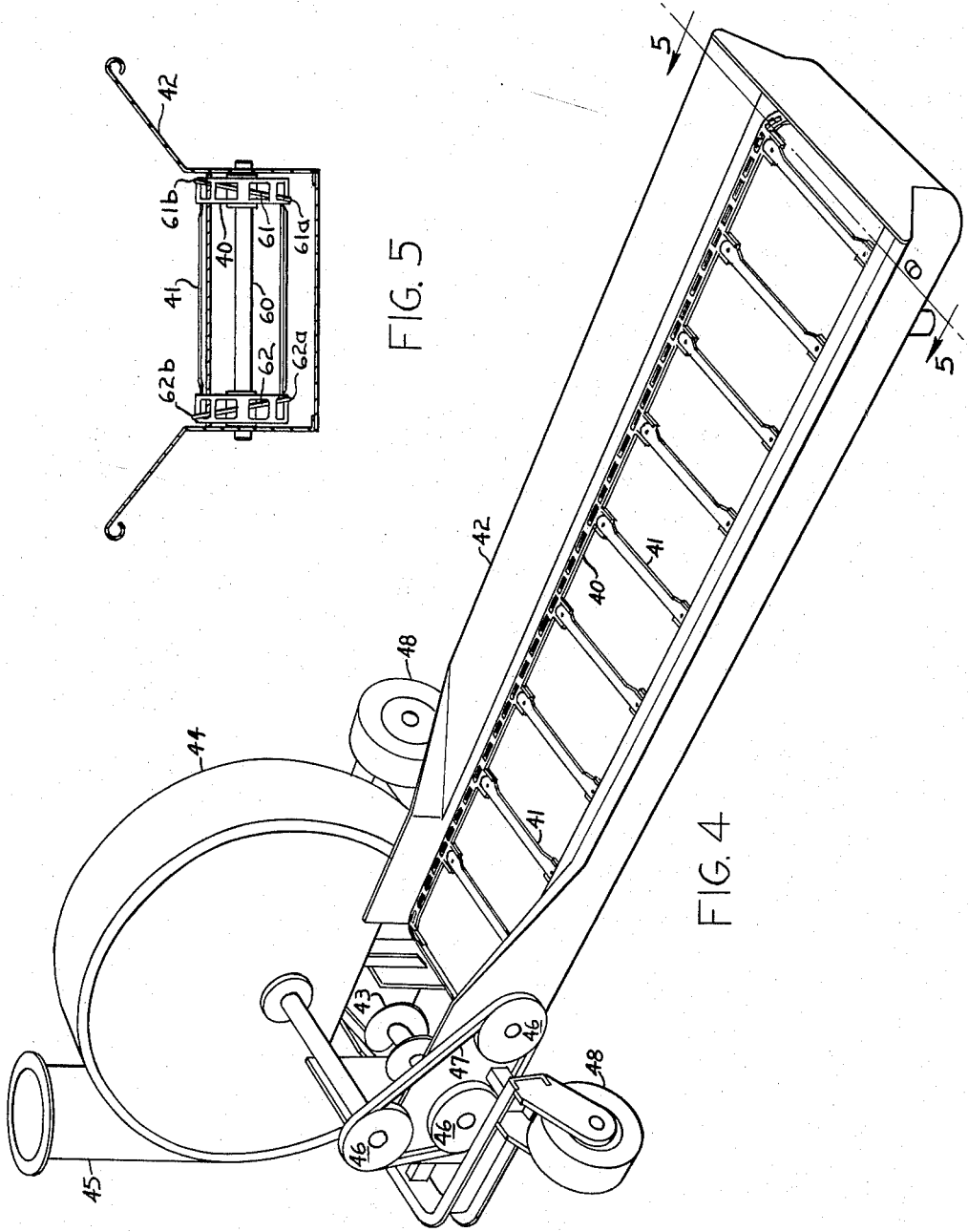

3,167,175
SELF-CLEANING CONVEYOR MECHANISM
Edward V. Kools, Appleton, Wis., assignor to Kools Brothers, Inc., Menasha, Wis., a corporation of Wisconsin
Filed Aug. 14, 1961, Ser. No. 131,305
4 Claims. (Cl. 198—229)

This invention relates to an improved mechanical linkage, and more particularly to an improved form of gear to drive or be driven by a chain linkage or another gear. The invention is especially advantageous in situations where a mechanical linkage is to be operated in circumstances involving the presence of interfering materials which are apt to become entangled in the linkage. In such operations, the materials may become bound into the driving mechanism, causing substantial interference with the operation thereof, frequently resulting in stoppage of the operation and even breakage of parts of the mechanism.

Most particularly, the invention relates to an improved gear wheel or sprocket wheel, which in its association with connecting elements of a mechanical linkage substantially eliminates the possibility of interference with the driving mechanism by pliable materials which may tend to clog the driving action.

The unique advantages of the present invention will become clear from the following description of the invention in conjunction with the appended drawings, in which:

FIGURE 4 is a perspective view of a conventional forage blower incorporating the invention;

FIGURE 5 is a cross sectional view, taken along the line 5—5 of FIGURE 4; and

Figure 1:
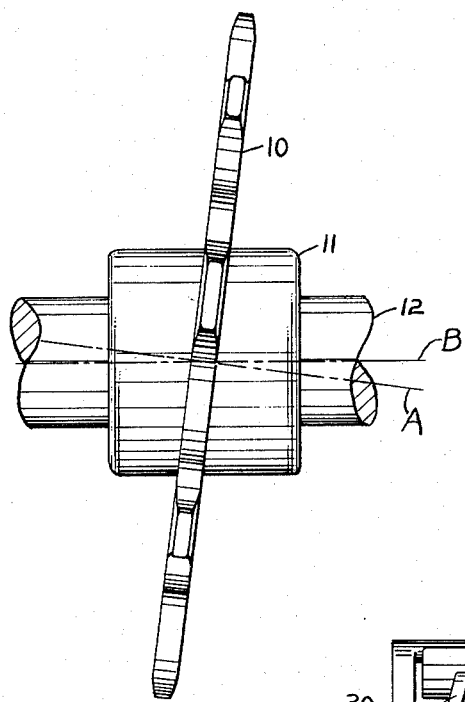
FIGURE 1 is a side elevation of the simplest form of the invention.

Referring first to FIGURE 1, in its more basic form the invention includes a gear or sprocket wheel 10 fixedly mounted such as by welding or by a conventional key to a hub 11, which in turn is mounted on a shaft 12. If shaft 12 is a driven or driving shaft, hub 11 will be fixedly mounted thereon such as by welding or a conventional key. If gear or sprocket wheel 10 is an idler gear or sprocket wheel, hub 11 may be rotatably mounted on shaft 12 in any conventional manner.

It will be observed that the axis A of gear or sprocket wheel 10 is at a substantial angle with respect to the longitudinal or rotational axis B of shaft 12, so that gear or sprocket 10 is substantially canted relative to shaft 12.

Figure 2:
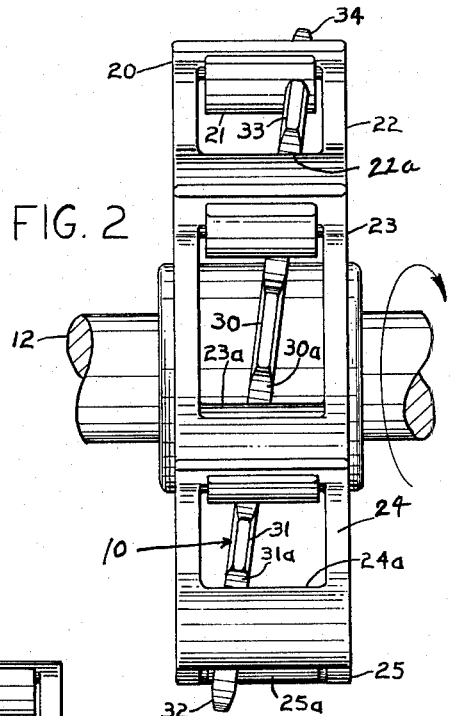
FIGURE 2 is a side elevation of this form of the invention in conjunction with a chain linkage.

FIGURE 2 shows element 10 mounted as a sprocket wheel adapted to drive or be driven by a conventional chain linkage 20, of which all or parts of individual links 21–25 are visible. As shown in FIGURE 2, sprocket wheel 10 is mounted to act as a driven sprocket, the driving motion being imparted by chain linkage system 20. If the direction of rotation were opposite that depicted, sprocket 10 would properly serve as a driving sprocket adapted to impart motion to chain 20.

As depicted in FIGURE 2, the essentially straight internal edge 23a of link 23 is contacted at approximately its central portion by the portion 30a of tooth 30 on sprocket 10. However, the corresponding portion 24a of link 24 is contacted by area 31a of tooth 31 at a point substantially leftward (as seen in FIGURE 2) of the middle point of tooth portion 24a and portion 25a of link 25 is contacted at approximately its most leftward area by tooth 32. Conversely, portion 22a of link 22 is contacted by tooth 33 at a point of the right of center, and the next succeeding link 21 will be contacted by tooth 34 at approximately its most righthand point.

Figure 3:
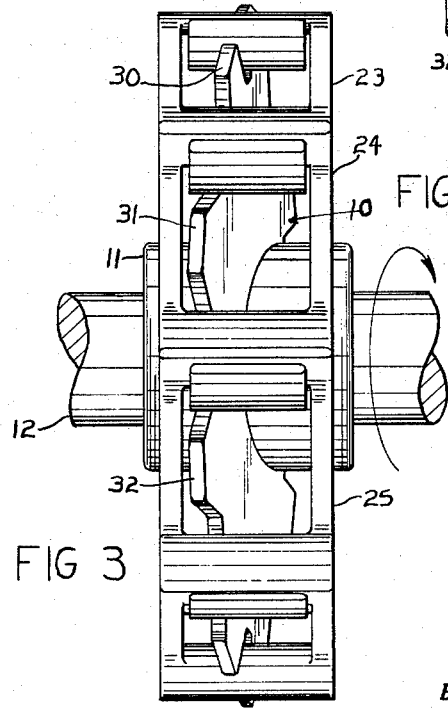
FIGURE 3 is an elevation corresponding to FIGURE 2 but viewed in the position where the sprocket wheel has rotated 90° from the position of FIGURE 2.

FIGURE 3 is a view similar to FIGURE 2, but showing the mechanism in the position at the time when sprocket wheel 10 has rotated 90° from its position in FIGURE 2.

Figure 6:
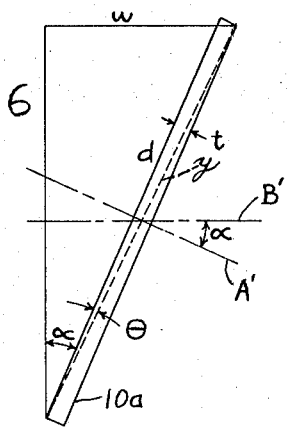
FIGURE 6 is a schematic view, corresponding to FIGURE 2, used for explanation of certain relationships of elements of the invention.

From consideration of FIGURES 2 and 3, it will be clear that as sprocket 10 rotates, either driving or being driven by chain 12, successive internal contacting areas of the links of the chain will be contacted at progressively changing points as the sprocket rotates, the progression being from, for example, the most leftward point of contact of a sprocket tooth with the chain to the most rightward point of contact, thence progressively back to the left, whereupon the cycle is continuously repeated. This is possible because the thickness or dimension of sprocket 10 parallel to its axis A is relatively small as compared with the internal or cutout area of the chain links, coupled with the canted mounting of sprocket 10 upon hub 11. It will be clear that to prevent the "wobbing" movement of sprocket 10 as it rotates from imparting movement to the chain in a direction parallel to the axis B, the cylinder circumscribed by the rotation of sprocket 10 should have a length (parallel to axis B) no greater than the width of the cutout portions of the chain links. That is, the angle between axes A and B should not exceed the angle the sine of which when multiplied by the outside diameter of sprocket 10 plus the cosine of which when multiplied by the thickness of sprocket 10 equals the internal dimension of the chain links parallel to axis B. This mathematical relationship will be understood from reference to FIGURE 6, in which $w$ represents the internal width of a chain link, $10a$ represents a canted sprocket wheel having axis $A'$, $B'$ is the axis of a shaft upon which wheel $10a$ is mounted, $\alpha$ is the angle between axes $A'$ and $B'$, and $t$ and $d$ are respectively the thickness and outside diameter of wheel $10a$. It will be clear that, $$\theta = \tan^{-1}\frac{t}{d}$$

$$y = t \csc \theta = t \csc \tan^{-1}\frac{t}{d}$$

$$\alpha + \theta = \sin^{-1}\frac{w}{y}$$

$$\alpha = \sin^{-1}\frac{w}{t \csc \tan^{-1}\frac{t}{d}} - \tan^{-1}\frac{t}{d}$$

With $t$, $d$ and $w$ being known quantities, the maximum value of angle $\alpha$ may be determined pursuant to the above formula. That is, $$\alpha \leq \sin^{-1}\frac{w}{t \csc \tan^{-1}\frac{t}{d}} - \tan^{-1}\frac{t}{d}$$

FIGURE 4 shows a conventional forage blowing apparatus incorporating the present invention. The apparatus includes a chain conveyor mechanism generally indicated at 40, including conveyor bars or elements 41, mounted in a bed or platform 42, and upon which forage is fed for conveyance into the blowing portion of the apparatus. The conveyor carries forage fed thereon to an auger or other auxiliary conveyor 43, which carries the forage into the blower unit 44 from which it is blown through outlet pipe 45 into a silo or elsewhere for disposition. The unit includes conventional driving means such as pulley 46 and belt 47 by which it is driven from a suitable conventional source, and may be mounted upon wheels 48 for suitable transport to alternate locations.

FIGURE 5 shows additional details of the invention as particularly adapted to the apparatus of FIGURE 4. Shaft 60 has mounted thereon, in canted fashion, sprocket wheels 61 and 62. Sprocket 61 is mounted as shown in FIGURE 2, while sprocket 62 is mounted in opposite fashion, with the result that circumferentially corresponding points 61a and 62a on sprocket 61 and 62 respectively are more closely adjacent than any other points about the peripheries about the sprockets, while diametrically opposite points 61b and 62b respectively are spaced farther apart than any other points about the peripheries of the sprockets. While this opposite mounting is not essential to substantial achievement of the objects of the invention, it will be obvious that this results in the most complete elimination of lateral movement or "play" of the conveying chain mechanism 40 in the direction parallel to shaft 60.

A principal purpose of the invention is to avoid clogging of the driving mechanism comprising, for example, sprockets 61 and 62 and the chain conveyor 40. Particularly in an apparatus such as the forage blower shown in FIGURE 4, fragments of the forage placed onto the conveyor tend to be carried around with the chain mechanism, or tend to come between the sprockets and the chain links which are driving or being driven thereby. A sufficient buildup of the forage material between the sprockets and the chain links will of course result in a tightening of the chains, which materially interferes with the operability of the apparatus, and indeed frequently becomes sufficiently great to result in breakage of the chain links, of the sprockets, or of other associated parts of the machine. Features of the present invention permit substantial elimination of this possible difficulty because of two particular features. First, the sprocket wheel is relatively thin, in the dimension parallel to its axis, so that it fairly effectively exercises a cutting action on material imposed between it and the associated mechanism, such as links of a chain. This cutting action tends to break up the imposed material which tends to clog the mechanism. Second, the canting of the sprocket wheel relative to the axis of the shaft on which it is mounted causes the sprocket to contact the chain links at progressively differing points, with the result that the cutting action is made effective across substantially the entire width of the links. Additionally, this progressive contact reduces the tendency to pack the clogging material into the linkage, as compared to the conventional mechanism in which the contact is unvaried.

I claim:

1. In a self-cleaning conveyor mechanism, a shaft, a sprocket wheel mounted on said shaft to rotate about the longitudinal axis thereof, said sprocket wheel having its axis at a substantial angle relative to the longitudinal axis of said shaft, and a conveyor chain having links engaged by said sprocket wheel, said conveyor chain links having openings for receiving the sprocket teeth of said sprocket wheel, said openings being substantially wider than the width of said sprocket teeth, and said conveyor chain being restrained against substantial lateral movement so that the sprocket teeth move back and forth within the link openings to clear debris therefrom.

2. A conveyor mechanism according to claim 1, further including a second sprocket wheel mounted on said shaft in spaced relation to the first-mentioned sprocket wheel for rotation about said longitudinal axis, the axis of the second sprocket wheel being at a substantial angle relative to the longitudinal axis of the shaft, said sprocket wheels being oppositely mounted on said shaft to present circumferentially corresponding points on their respective peripheries spaced closer together than any other points on their respective peripheries and to present diametrically opposite points on their respective peripheries further apart than any other points on their peripheries, and a scond conveyor chain engaged by the second sprocket wheel, said conveyor chain links having openings for receiving the sprocket teeth of said sprocket wheel, said openings being substantially wider than the width of said sprocket wheel, and said conveyor chain being restrained against substantial lateral movement so that the sprocket teeth move back and forth within the link openings to clear debris therefrom, and conveying elements mounted on and connecting said chains.

3. A conveyor mechanism according to claim 2, wherein the angular relationship α of the axes of said sprocket wheels relative to the axis of said shaft is $$\alpha \leq \sin^{-1}\frac{w}{t \csc \tan^{-1}\frac{t}{d}} - \tan^{-1}\frac{t}{d}$$

wherein $w$ is the respective internal width dimension of the links of said chains, $t$ is the thickness of the respective sprocket wheels, and $d$ is the outside diameter of the respective sprocket wheels.

4. In a self-cleaning conveyor mechanism, a shaft, a sprocket wheel mounted on said shaft for rotation about the longitudinal axis of the shaft, said sprocket wheel having its axis at a substantial angle relative to the longitudinal axis of the shaft, a conveyor chain having links engaged by said sprocket wheel, and conveying elements carried by said chain, the angular relationship α of the axis of said sprocket wheel relative to the axis of said shaft being $$\alpha \sin \leq^{-1}\frac{w}{t \csc \tan^{-1}\frac{t}{d}} - \tan^{-1}\frac{t}{d}$$

wherein, $w$ is the internal width dimension of the links of said chain, $t$ is the thickness of said sprocket wheel, and $d$ is the outside diameter of said sprocket wheel, said conveyor chain links having openings for receiving the sprocket teeth of said sprocket wheel, said openings being substantially wider than the width of said sprocket wheel, and said conveyor chain being restrained against substantial lateral movement so that the sprocket teeth move back and forth within the link openings to clear debris thereform.

References Cited by the Examiner

UNITED STATES PATENTS

| | | | |
|---|---|---|---|
| 536,813 | 4/95 | MacPhail et al. | 74—243 |
| 716,094 | 12/02 | Peoples | 144—238 |
| 1,020,900 | 3/12 | Hadley | 74—243 X |
| 1,221,471 | 4/17 | Miller | 74—243 |
| 2,954,864 | 10/60 | Lee et al. | 198—175 |

SAMUEL F. COLEMAN, *Primary Examiner.*

WILLIAM B. LA BORDE, ERNEST A. FALLER, Jr., *Examiners.*